(12) United States Patent
McMullen et al.

(10) Patent No.: US 7,436,785 B1
(45) Date of Patent: Oct. 14, 2008

(54) METHOD AND SYSTEM FOR LOCATION BASED SUBJECT MATTER TELECONFERENCING

(75) Inventors: Michael P. McMullen, Leawood, KS (US); Terry G. Rayburn, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1119 days.

(21) Appl. No.: 10/712,234

(22) Filed: Nov. 12, 2003

(51) Int. Cl.
*H04M 3/42* (2006.01)
(52) U.S. Cl. .................. 370/261; 379/204.01; 709/204; 713/168
(58) Field of Classification Search .................. 370/261; 379/204.01; 709/204; 713/168
See application file for complete search history.

(56) References Cited

U.S. PATENT DOCUMENTS

| | | | | |
|---|---|---|---|---|
| 4,796,293 | A | 1/1989 | Blinken et al. | 379/202 |
| 5,408,518 | A | 4/1995 | Yunoki | 379/67 |
| 5,436,896 | A | 7/1995 | Anderson et al. | 370/62 |
| 6,839,417 | B2 * | 1/2005 | Weisman et al. | 379/204.01 |
| 6,881,107 | B2 | 4/2005 | Roycroft | |
| 2002/0102999 | A1 | 8/2002 | Maggenti et al. | |
| 2002/0107008 | A1 | 8/2002 | Hendrey et al. | |
| 2002/0115453 | A1 | 8/2002 | Poulin et al. | |
| 2002/0160766 | A1 | 10/2002 | Portman et al. | |
| 2003/0060197 | A1 | 3/2003 | Benes et al. | 455/433 |
| 2003/0060214 | A1 | 3/2003 | Hendrey et al. | |

OTHER PUBLICATIONS

U.S. Appl. No. 09/993,007, filed Nov. 14, 2001.
Office Action from U.S. Appl. No. 10/716,845, dated Sep. 9, 2005.
Invertix Corporation IM Anywhere Privacy Management System, http://www.invertix.com/products_features_privacymanagement.html, printed form the World Wide Web on Aug. 14, 2001.
Followap Telecommunications, iFollow Products Family, http://www.followap.com/shtm/follow_main.shtml, printed from the World Wide Web on Aug. 14, 2001.
Invertix Corporation IM Anywhere Mobiel Buddy List Features, http://www.invertix.com/products_features_mobilebuddylist.html, printed form the World Wide Web on Aug. 14, 2001.
Wireless Developer Network, Addition of Location Management to Wireless IM Set to Drive GPRS Adoption, http://www.wirelessdevnet.com/news/2001/23/news2.html, printed from the World Wide Web on Aug. 14, 2001.
GartnerGroup, Yahoo!Find-a-Friend: Wireless or Borderless Privacy? http://gartner11.gartnerweb.com/public/static/hotc/hc00088645.html, printed form the World Wide Web on Sep. 6, 2001.
Ericsson, www.telecomcorridor.com/wireless%20horizons/1Coyne.pdf, printed from the World Wide Web on Jun. 27, 2001.

* cited by examiner

*Primary Examiner*—Gerald Gauthier

(57) ABSTRACT

A method and system for location based subject matter teleconferencing is disclosed. A user makes a request to join a teleconference based on the user's location and subject matter. A conference-call-setup-system ("CCSS") receives the request. The CCSS determines the location of the user and identifies the teleconference that matches the request. Additionally, the CCSS may use the time of the request when identifying the teleconference that matches the request. The CCSS then arranges for a conference bridge to join the user to the teleconference. As a result, the user can communicate with other users in the same general location who want to discuss the same subject matter.

14 Claims, 3 Drawing Sheets

US 7,436,785 B1

METHOD AND SYSTEM FOR LOCATION BASED SUBJECT MATTER TELECONFERENCING

FIELD OF THE INVENTION

The present invention relates to communication systems and, more particularly, to a method and system for location based subject matter teleconferencing.

BACKGROUND

Cellular wireless communication is an increasingly popular means of personal communication in the modern world. People are using cellular wireless networks for the exchange of voice and data over cellular telephones, Personal Digital Assistants ("PDAs"), cellular telephone modems, and other devices. In principle, a cellular wireless user can seek information over the Internet or call anyone over a Public Switched Telephone Network ("PSTN") from any place inside the coverage area of the cellular wireless network.

An important feature of contemporary cellular wireless networks is the ability to locate the geographical position of a mobile station. Such a feature was developed initially to assist emergency services in locating a mobile station. For example, in the United States, the Federal Communications Commission ("FCC") has mandated the implementation of "Enhanced 911" ("E911") services.

The E911 mandate was divided into two phases. According to Phase 1, the location must be identified with an accuracy of at least cell and sector. As this information is typically maintained by a wireless cellular carrier in a subscriber's home location register ("HLR"), Phase 1 presents little technical challenge. According to Phase 2, the location must be provided with an accuracy of at least 100 meters (or 50 meters for handset-originated methods such as global position satellite ("GPS") system), which is typically far more granular than the cell and sector information maintained in the HLR. In response, the Telecommunications Industry Association ("TIA") has proposed a standard for "Enhanced Wireless 9-1-1, Phase 2," or "TIA/EIA/IS-J-STD-036-A" ("J-STD-036-A"), the entirety of which is hereby incorporated by reference.

In order to achieve the accuracy specified by Phase 2, a cellular wireless network may employ special position determining equipment and techniques. Alternatively, a mobile station itself may employ a position determining system, such as a GPS system, and may relay its position to the network, for reference by the emergency services. The emergency services may then use the position of the mobile station to help assist a user of the mobile station.

Cellular wireless carriers and third party application providers have recognized aspects of the commercial significance of this new-found location information, well beyond use of the information for emergency services. In particular, knowing where a mobile station is located, a service provider may now provide a wide range of valuable location-based services.

One such service is reporting the location of a mobile subscriber. For instance, when a mobile subscriber engages in a communication session with another party, the wireless carrier can determine the location of the mobile subscriber and notify the other party of the mobile subscriber's location. Typically, the wireless carrier maintains a list of pre-approved names that may receive the location of the mobile subscriber.

Methods of teleconferencing are also known. A conference call, or teleconference, is a telephonic connection among a number of participants located in different places. To conduct a teleconference, a conference bridge may be used. The conference bridge can reside in a telecommunications network and can function as a bridging or switching device between the participants to support the teleconference. The conference bridge can bridge together multiple communication sessions so that the conference call participants can confer with each other via the conference bridge.

SUMMARY

The present invention provides a method and system for facilitating conference calls based on consideration of (i) user location and (ii) subject matter. The method comprises receiving into a conference-call-setup-system ("CCSS") a request from a user to join a teleconference. The request indicates a subject matter of the teleconference. After receiving the request, the CCSS determines a location of the user. The CCSS then selects a teleconference based on (i) the location and (ii) the subject matter, and then joins the user into the teleconference. The location may be a fixed location or a moving location. The CCSS can also select a teleconference based on time of the request.

The system for location based subject matter teleconferencing comprises a conference bridge, a location system, and the CCSS. The conference bridge may be co-located with and/or integrated into the CCSS. The conference bridge is operable to support a teleconference between at least two conference call participants that have a similar location and a similar subject matter interest. The location system is operable to determine the location of the conference call participants. The CCSS is operable join the conference call participants into a location based subject matter teleconference.

The method and system for location based subject matter teleconferencing allows teleconference participants who are similarly located and have a similar subject matter interest to communicate with each other. These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
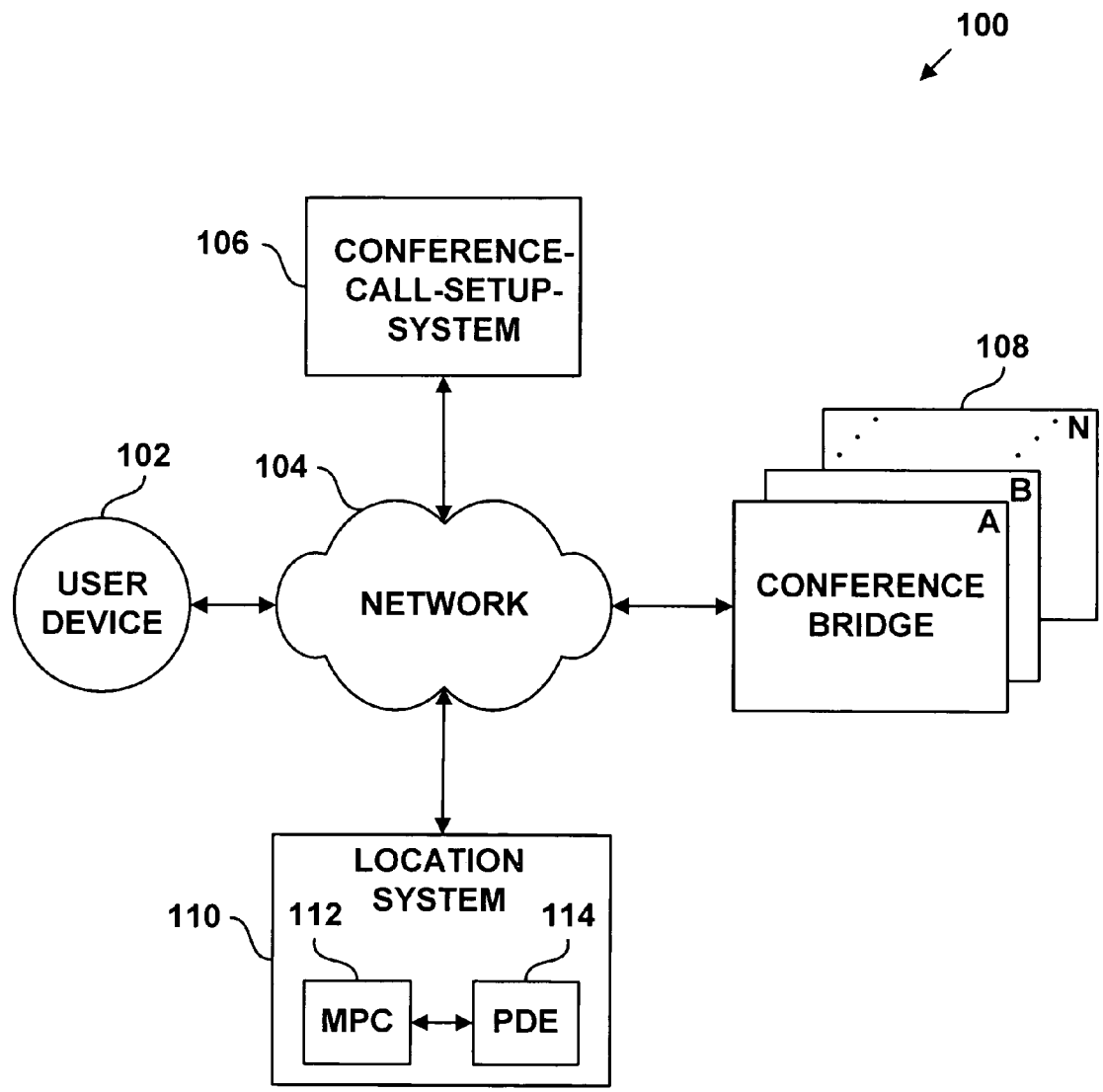
FIG. 1 is a block diagram of a system for facilitating location based subject matter teleconferences in accordance with an exemplary embodiment.

FIG. 1 depicts a block diagram of system 100 for facilitating location based subject matter teleconferences in accordance with an exemplary embodiment of the invention. The system 100 includes a user device 102, a network 104, a conference-call-setup-system ("CCSS") 106, at least one conference bridge 108, and a location system 110. The CCSS 106 and the conference bridge 108 are depicted in FIG. 1 as stand-alone entities; however, the CCSS 106 and the conference bridge 108 may be co-located and/or integrated. Further, the system 100 may include additional entities not shown in FIG. 1.

The user device 102 may be any device that can be used for communications, such as a landline telephone, a cellular telephone, a personal digital assistant, a personal computer, or other telecommunication device. The user device 102 may be a device whose position can be determined by the location system 110. Additionally or alternatively, the user device 102 may be a device that has the capability to determine its own position. For example, the user device 102 may include a GPS chipset.

According to an exemplary embodiment, the user device 102 may be a third generation ("3G") or later mobile station capable of simultaneously engaging in voice and data sessions. A 3G mobile station preferably operates in compliance with the 3GPP/3GPP2 industry specifications. (The 3GPP/3GPP2 industry specifications may be found at www.3gpp.org and www.3gpp2.org, respectively.) The user device 102 may include a processor programmed with (i) a media codec (such as G.723.1 for encoding and decoding digital voice signals), (ii) a Session Initiation Protocol ("SIP") user agent application to set up packet-data communication sessions, and/or (iii) real-time transport protocol ("RTP") application to facilitate sending and receiving real-time media packet streams, such as Voice over Internet Protocol ("VoIP").

The network 104 may provide a communication pathway between the user device 102, the CCSS 106, the conference bridge 108, and the location system 110. The network may be a circuit-switched network, such as the public switched telephone network ("PSTN"). Additionally or alternatively, the network may be a packet-switched network, such as the Internet or an intranet.

The CCSS 106 may be any combination of hardware, firmware, and/or software that is operable to correlate a particular teleconference with (i) user location and (ii) subject matter. The CCSS 106 may also correlate a particular teleconference with the time at which a user makes a request to join a teleconference. Adding the time of request as a factor for correlating a teleconference may be useful when the same location is used for similar subjects at different times.

In operation, the CCSS 106 may receive a request from a user device 102 to join a teleconference. The request may designate a particular subject and the request may further designate the user's current location. Alternatively, upon receipt of the request, the CCSS 106 might learn of the user's current location by querying the location system 110. The request from the user device 102 and/or the response from the location system 110 may indicate the user's current location with any degree of granularity (e.g., cell/sector or latitude/longitude). Additionally, the CCSS 106 may include a clock to determine the time at which the request was made.

The CCSS 106 may then refer to its logic to select a teleconference that matches the user's current location and designated subject matter. The CCSS 106 may also refer to its logic to select a teleconference that matches the time of the request. The CCSS 106 may then join the user into the selected teleconference. The other teleconference participants may also be in the same location and have the same subject matter interest as the user because the CCSS 106 has similarly joined the other teleconference participants. In the teleconference, the user can then talk or otherwise communicate with other users in the same general location who seek to discuss the same subject matter. Advantageously, the CCSS 106 allows users who may be unknown to each other but who have a similar interest and are similarly located to easily join into a teleconference with each other. Additional details regarding the CCSS 106 are described with reference to FIG. 2 and FIG. 3.

Figure 2:
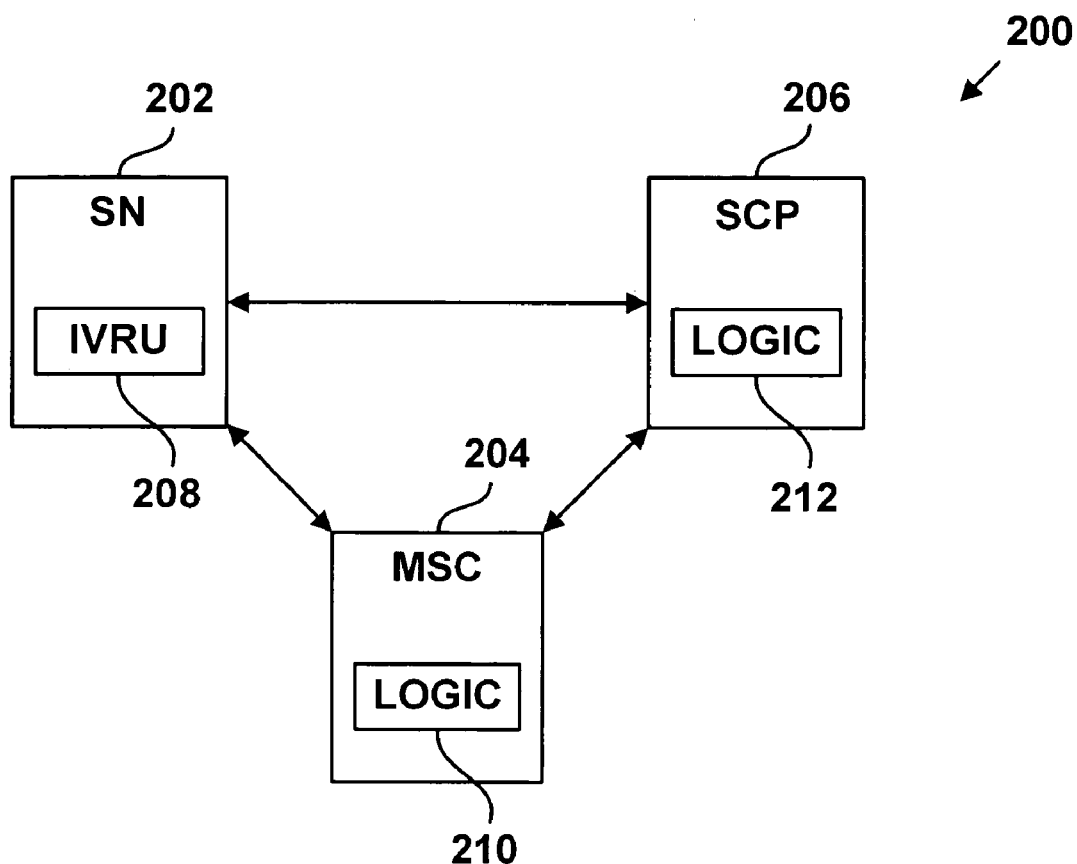
FIG. 2 is a block diagram of a conference-call-setup-system in accordance with an exemplary embodiment.

FIG. 2 is a block diagram of a CCSS 200 in accordance with an exemplary embodiment. The CCSS 200 may be substantially the same as the CCSS 106 depicted in FIG. 1. The CCSS 200 may include a service node ("SN") 202; a local switch 204, such as a Mobile Switching Center ("MSC"); and a Service Control Point ("SCP") 206. The CCSS 200 may include additional entities not shown in FIG. 2 or could otherwise vary in form from that shown.

The SN 202 may provide voice and other interactions with users, and may facilitate and perform various enhanced services for the local switch 204. The SN 202 may include an Interactive Voice Response Unit ("IVRU") 208. The IVRU 208 may be a combination of software, firmware, and hardware that accepts a combination of voice telephone inputs and touch-tone keypad selections and provides appropriate responses. The IVRU 208 may allow a caller to enter information using a remote touch-tone telephone, and may use a digitized synthesized voice to prompt and answer the caller. Those skilled in the art are familiar with the arrangement and operation of an IVRU.

The IVRU 208 may provide an interface between speech commands or dual tone multi-frequency ("DTMF") keypad selections provided by the user at the user device 102 and entities within the CCSS 200. The user of the user device 102 may, by speaking commands or providing keypad selections, browse through navigation points (e.g., applications and/or menu items within the applications) to select a subject matter. The IVRU 208 can thus receive, for instance, spoken commands or keypad selections from the user and use the inputs to guide its execution of voice command applications.

As a condition of joining the teleconference, the IVRU 208 may also be used to play an advertisement to each user that seeks to join a given location based subject matter teleconference. The advertisement may be used to cover costs associated with the location based subject matter teleconference. The advertisement could relate to the subject matter of the teleconference. Alternatively or additionally, the CCSS 200 might collect credit card or other payment information from each user who wants to participate as a condition of joining the teleconference.

In a preferred embodiment, the IVRU 208 may be a software application. The software application may be written in a variety of computer languages. For example, the IVRU 208 may be programmed in VoiceXML ("VXML"). VXML is a tag-based computer language similar to the HTML language that underlies most Internet web pages. Other languages, such as SpeechML and VpxML, may also be used.

The local switch 204 may be a telecommunications switch operable to provide call control, processing, and access to the PSTN. The local switch 204 may include logic 210. The logic 210 may be activated when the user makes a request to join a teleconference. The logic 210 in the switch 204 may function to cause the switch 204 to send a signaling message to the SCP 206 upon receiving the request from the user to join a teleconference.

The SCP 206 may include control information and call processing logic to assist the local switch 204 in call setup. In an exemplary embodiment, the SCP 206 includes logic 212. The logic 212 may function to correlate various conference bridge numbers with (i) location and (ii) subject matter. The logic 212 may also function to correlate various conference bridge numbers with time of request. The conference bridge numbers may be in the form of a telephone number. The SCP 206 may also communicate with the SN 202 to prompt the IVRU 208 to provide the user with subject matter choices and/or to play an advertisement.

To initiate a request to join a teleconference, the user may dial a feature code using the user device 102. The feature code may be a series of keystrokes that correspond with a particular subject matter category. The logic 210 in the local switch 204 may function to cause the local switch 204 to send a signaling message, such as a TIA/EIA/IS-771 origination request invoke ("ORREQ") message, to the SCP 206 upon detection of the dialed feature code. The ORREQ message may include an indication of the cell/sector in which the user device 102 is currently located. Alternatively or additionally, the SCP 206 may respond to the request by querying the location system 110 to learn of the current location of the user device 102. After the SCP 206 receives the ORREQ message from the local switch 204, the SCP 206 may refer to its logic 212 to identify a conference bridge number to which the user should be connected.

Additionally, the SCP 206 may send a message to the local switch 204 specifying that the request should be transferred to the SN 202. The local switch 204 may then send the request to the SN 202. When the SN 202 receives the request from the local switch 204, the SN 202 may query the SCP 206 for call processing instructions. The query may be performed using a Bellcore SR-3511 message for instructions on call processing; however, other protocols may be used. The SCP 206 may instruct the SN 202 to prompt the IVRU 208 to play an advertisement based on the chosen subject matter.

In another embodiment, the IVRU 208 may be used to select the subject matter of the teleconference. To initiate a request to join a teleconference, the user may dial a feature code using the user device 102. The feature code may indicate a general request to join a teleconference, but not specify the subject matter of the desired teleconference. The local switch 204 may send an ORREQ message to the SCP 206 upon detection of the dialed feature code. After the SCP 206 receives the ORREQ message from the local switch 204, the SCP 206 may send a message to the local switch 204 specifying that the request should be transferred to the SN 202. The local switch 204 may then send the request to the SN 202.

When the SN 202 receives the request from the local switch 204, the SN 202 may query the SCP 206 for call processing instructions. The SCP 206 may instruct the SN 202 to prompt the IVRU 208 to provide subject matter choices to the user. The IVRU 208 may prompt the user to select the subject matter of a teleconference. The user responses, which may be in the form of spoken commands or keypad selections, to the IVRU 208 may be received by the SN 202. The SN 202 may then provide the subject matter selection to the SCP 206. The SCP 206 may then refer to its logic 212 to identify a conference bridge number to which the user should be connected.

Whether the feature code specifies the subject matter of a teleconference or indicates a general request to join a teleconference, the SCP 206 may then instruct the local switch 204 to connect the user to the teleconference. For example, the SCP 206 may send an origination request return result ("orreq") message to the local switch 204. The instruction may include a conference bridge number that identifies a particular conference bridge 108 to which the local switch 204 should connect the call. The local switch 204 may then connect the call to the identified conference bridge 108. As multiple users join the teleconference, the conference bridge 108 may bridge the calls together allowing the users to communicate with each other.

Figure 3:
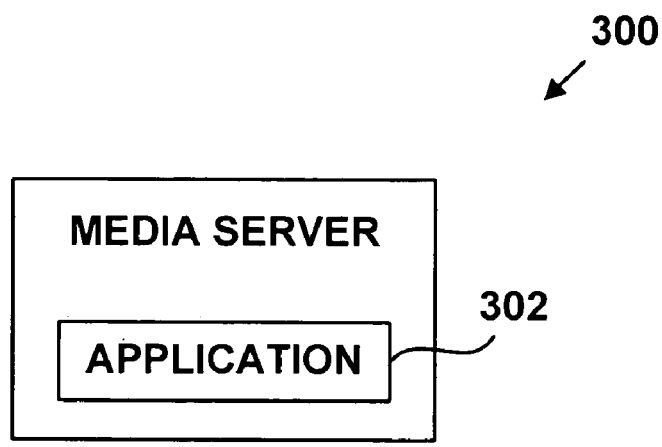
FIG. 3 is a block diagram of a conference-call-setup-system in accordance with another exemplary embodiment.

FIG. 3 is a block diagram of a CCSS 300 in accordance with another exemplary embodiment. The CCSS 300 may be a media server on a packet-switched network 104. The CCSS 300 may include one or more applications 302. The CCSS 300 may include additional entities not shown in FIG. 3 or could otherwise vary in form from that shown.

The application 302 may be a software application operable to receive a session invitation message from a user requesting to join a location based subject matter teleconference and, in response to the message, join the user to the appropriate teleconference. The application 302 may also be operable to obtain locations of user devices 102 from the location system 110. Further, the application 302 may include the functions of an IVRU, such as those described with reference to IVRU 208. In a preferred embodiment, the application 302 may be a SIP application. However, other application protocols may be used including, but not limited to, H.323 and Media Gateway Control Protocol ("MGCP").

The CCSS 300 may bridge together communications in the form of voice-over-packet ("VoP"), carried, for instance, according to RTP. VoP media conferencing may provide an "instant connect" service, such as "push-to-talk" ("PTT"), where a user of one user device 102 can readily initiate a real-time media conference with one or more designated target users at other user devices 102. The initiating user may simply select a target user or group and then press an instant connect button on his or her user device 102, and the user's user device 102 would responsively signal to the CCSS 300 to initiate a teleconference between the initiating user and the selected user or group. The CCSS 300 may establish PTT groupings based on (i) location and (ii) subject matter. The PTT groupings may also be based on time of request.

For instance, a user might select a subject matter category via a menu on the user device 102 and then invoke a location-based PTT session based on that selection. In response, the user device 102 may generate and send a session invitation request message (or in SIP parlance, an INVITE message) to the CCSS 300 on the packet-switched network 104. The INVITE message may carry an indication of the selected subject matter, as well as an indication of the current location of the user device 102 (as determined by GPS, for instance). Alternatively, the CCSS 300 may learn of the current location of the user device 102 by querying the location system 110 for the location corresponding to the user device's identifier as indicated in the INVITE message.

Based on the location and subject matter, the CCSS 300 may then correlate the INVITE message with a particular conference bridge 108. The CCSS 300 may also correlate the INVITE message with a particular conference bridge 108 based on the time of the request. As in conventional PTT operation, the CCSS 300 may send a success indication to the user device 102. The success indication may be in the form of a signaling-system reply message, such as a SIP 200 OK message. The user device 102 may in turn send an acknowledgement message, such as a SIP ACK message, to complete setup of a conference leg between the user device 102 and the conference bridge 108. As additional users join the same teleconference in a similar manner, the conference bridge 108 may then bridge the users' conference legs together, allowing them to communicate with each other.

Referring back to FIG. 1, the conference bridge 108 may be any combination of hardware, firmware, and/or software that is operable to support a teleconference. While the conference bridge 108 is depicted in FIG. 1 as a stand-alone entity, the conference bridge 108 may be co-located with and/or integrated into the CCSS 106 or another entity connected to the network 104.

The conference bridge 108 may take the form of a switch or server class computer. For example, the conference bridge 108 may be a multipoint control unit programmed with (i) a SIP user agent application to set up packet-data communication sessions, (ii) an RTP application to facilitate sending and receiving of real-time media packet streams, and (iii) bridging logic to bridge together sessions between multiple users so that the users can communicate with each other. The conference bridge 108 may be operable to bridge communication sessions, so that the teleconference participants can confer with each other via the conference bridge 108.

Multiple conference bridges may be employed for different subject matters and locations. For instance, conference bridge A might be designated for one subject (S1) and one location (L1), conference bridge B might be designated for another subject (S2) and location L1, conference bridge C might be designated for subject matter S1 and another location (L2), and conference bridge D might be designated for subject matter S2 and location L2. As a specific example, location L1 could be one sports stadium, location L2 could be another sports stadium, subject matter S1 could be "home team" and subject matter S2 could be "visiting team."

Continuing with the example above, for instance, given a football game between home team X and visiting team Y, one teleconference might exist for fans of team X, and another teleconference might exist for fans of team Y. Users at the game (i.e., at the same location L1) who send into the CCSS 106 a request to join a teleconference on subject S1 (home team) would be joined into the teleconference for fans of team X, and users at the game who send into the CCSS 106 a request to join a teleconference on subject S2 (visiting team) would be joined into the teleconference for fans of team Y.

In that example, given a baseball game occurring concurrently in the same town between home team P and visiting team Q, another teleconference might exist for fans of team P, and another teleconference might exist for fans of team Q. Thus, users at the baseball game (i.e., at the same location L2) who send into the CCSS 106 a request to join a teleconference on subject S1 would be joined into the teleconference for fans of team P, and users at the game who send into the CCSS 106 a request to join a teleconference on subject S2 would be joined into the conference for fans of team Q.

Furthermore, a given facility may be used for more than one event in a given day. For example, a soccer game between home team A and visiting team B may be played in the same stadium (i.e., at the same location L1) before the football game between home team X and visiting team Y. A teleconference might exist for fans of team A, and another teleconference might exist for fans of team B. By directing calls to teleconferences based on the time of the request, users at the soccer game who send into the CCSS 106 a request to join a teleconference for fans attending the soccer game, would not be joined into a teleconference for the fans attending the football game. Similarly, users at the later football game who send into the CCSS 106 a request to join a teleconference for fans attending the football game would not be joined into a teleconference for the fans attending the soccer game.

While the examples above describe the location L1 and L2 as fixed locations, a location based subject matter teleconference may also be based on a moving location. For example, the teleconference participants may be traveling along the same stretch of road. The teleconference participants may be traveling together for a variety of reasons. The teleconference participants may be traveling to the same sports event described above. For example, Kansas University fans may be traveling to Kansas State to watch a Kansas University/Kansas State football game. The entire stretch of road between the two schools may be considered a fixed location, L1. Alternatively, the location L1 may move based on the time before the game is scheduled to begin.

As another example of a moving location L1, car and motorcycle enthusiasts may travel together to a rally or other gathering. It is common to see drivers of classic cars, Mazda Miatas, BMW Roadsters, Harley motorcycles, and so on traveling together. As the caravan of vehicles travel together, the location L1 of the location based subject matter teleconference may move with the caravan of vehicles.

Further, the location L1 may move based on the location of a moderator. One of the teleconference participants may be the moderator of the teleconference. The moderator may be the party who set up the teleconference in the first place or the first party to join the teleconference. As the moderator moves, the location L1 may move accordingly. For example, location L1 may be a ten mile radius surrounding the moderator.

Multiple conference bridges 108 may also be employed in situations in which the conference bridge 108 is unable to bridge together more than a threshold number of users at the same time, due to engineering or administrative restrictions. In those cases, the conference bridge 108 may establish additional teleconferences for the same location and same subject matter, as teleconferences get filled. For instance, the first 10 callers in a given location who seek to join a teleconference on subject matter S1 may be bridged into one teleconference, and the next 10 callers in that same location who seek to join a teleconference on the same subject S1 may be bridged into another teleconference.

The location system 110 may function to determine and/or report the locations of mobile stations, such as the user device 102. As such, the location system 110 could take a variety of forms. For example, the location system 110 could comprise a mobile position center ("MPC") 112 and a position determining entity ("PDE") 114 as defined by J-STD-036-A. Alternatively, the location system 110 may take other forms, including location systems that are developed in the future. Those skilled in the art are familiar with the arrangement and operation of location systems.

The MPC 112 may serve as an interface to the network 104 for the location system 110. As such, the MPC 112 may serve as the entity which retrieves, forwards, stores, and controls position data within the location system 110. When the MPC 112 receives a request for the location of a user device 102 from a requesting entity, the MPC 112 may select a PDE, such as PDE 114, to determine the position of the user device 102.

In the embodiment in which the MPC 112 is defined by J-STD-036-A, the MPC 112 may request the position of a user device 102 by sending a GepPositionDirective INVOKE ("GPOSREQ") message to the PDE 114. The GPOSREQ message may include details regarding the user device 102, such as a mobile identification number, so that the PDE 114 can determine the position of the requested user device 102. Upon receipt of the GPOSREQ message, the PDE 114 may determine the current position of the user device 102. Other messaging schemes may be employed.

For example, the PDE 114 may receive position information from the user device 102. The user device 102 may use a terrestrial positioning system, a celestial positioning system, or a combination of these systems to determine its position. Terrestrial positioning systems may utilize various techniques, such as forward link trilaterization ("FLT"); advanced forward link trilaterization ("AFLT"); amplitude difference, angle of arrival ("AD-AOA"); and enhanced observed time difference ("EOTD"). GPS is an example of a celestial positioning system. The PDE 114 may then process the position information, which may include analyzing pseudoranges obtained from the user device 102.

As another example, the PDE 114 may determine the position of the user device 102 by obtaining cell/sector data from a home location register ("HLR"). Other methods may also be used. Further, the PDE 114 may determine the location of the user device 102 when a user is engaged in a call, in data mode, and/or in idle mode.

In the embodiment in which the PDE 114 is defined by J-STD-036-A, the PDE 114 may then transmit a GeoPositionRequest RETURN RESULT ("gposreq") message containing the position information corresponding to the location of the user device 102 to the MPC 112. When the MPC 112 receives the gposreq message from the PDE 114, the MPC 112 may forward the position information to the requesting entity. Other messaging schemes may be employed.

Figure 4:
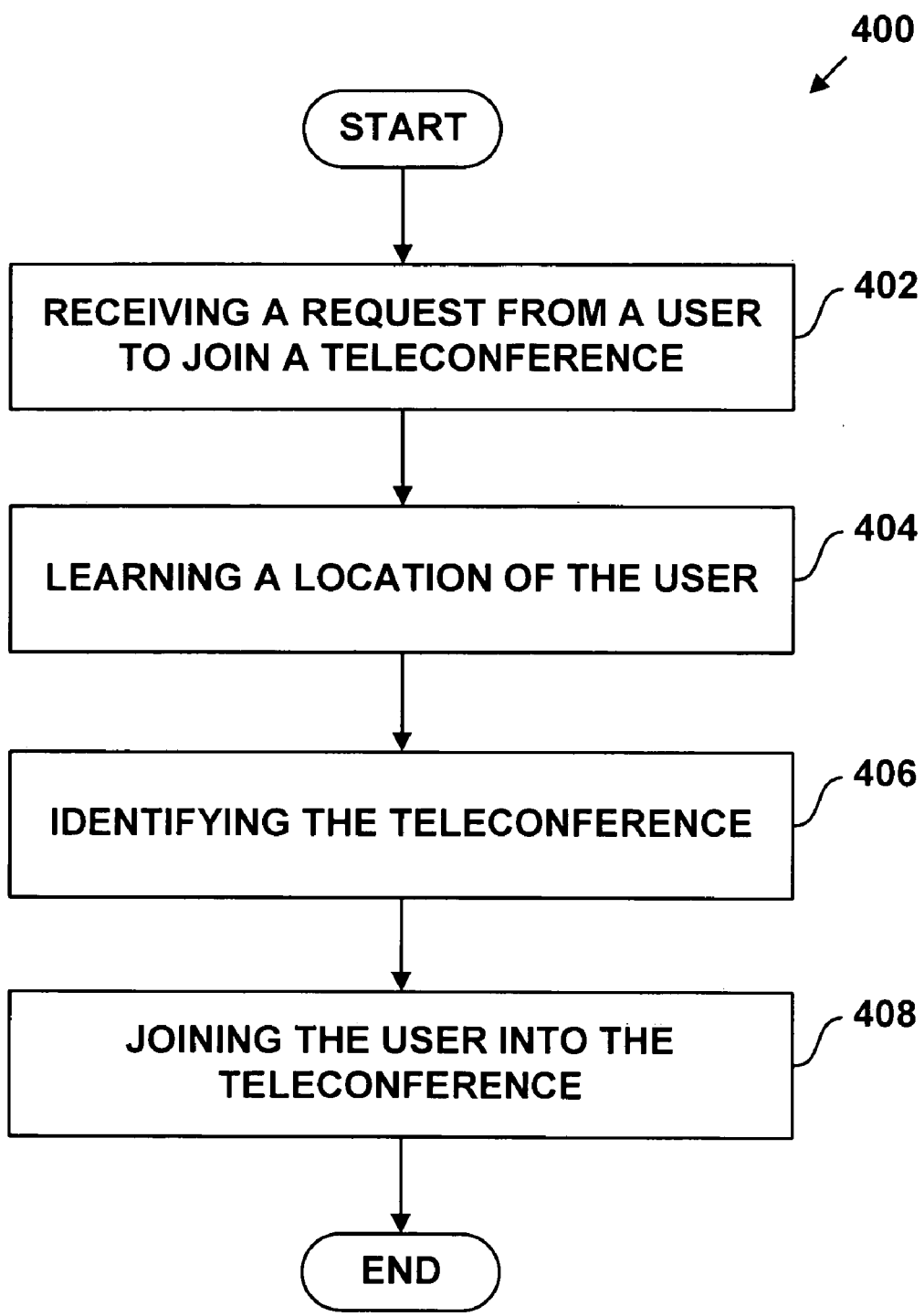
FIG. 4 is a flow chart of a method for joining a user into a location based subject matter teleconference in accordance with an exemplary embodiment.

FIG. 4 is a flow chart of a method 400 for joining a user into a teleconference in accordance with an exemplary embodiment. The method 400 is described with reference to the system 100 for facilitating location based subject matter teleconferences depicted in FIG. 1, unless otherwise specified.

At block 402, the CCSS 106 receives a request from a user device 102 to join a teleconference. The request may include the location of the user device 102. The user may select a teleconference to join by dialing a feature code. The feature code may correspond to a particular subject matter category. For instance, feature code *37 could be for "sports," feature code *371 could be for "home team," and feature code *372 could be for "visiting team." Additional feature codes may be used for more specific subject matter categories, such as *3711 for quarterback of the home team, *3712 for offense of the home team, *3713 for defense of the home team, *3714 for a controversial call, and so on. The number of digits in the feature code is not limited by the examples.

Alternatively, the user may call a general conference call line and an IVRU may assist the user in selecting the subject matter of the teleconference. The CCSS 106 may interact with a user to refine the user's subject matter interest and to direct the user to a teleconference more specifically. For instance, if a fan at a football game dials the feature code *37 to join a sports conference for fans who are similarly located, an IVRU located within the CCSS 106 may prompt the user to "press 1 for home team" or "press 2 for visitor team."

As another alternative, the user may select a teleconference via a data session. Applying existing click-to-dial techniques, a user who is engaged in a web browsing session may click on a link to join a location based subject matter teleconference as presently contemplated. The CCSS 106 may set up a conference leg between the user and the conference bridge 108 using, for instance, third party call control.

As yet another alternative, the user may enter an interest profile into a client computer attached to the network 104. The interest profile may identify subjects in which the user is interested. The user may enter the interest profile directly on the user device 102 or by using a web based application servicing the client computer. Additionally, the user device 102 may display available location based subject matter teleconferencing options for the user to select based on the interest profile previously entered.

At block 404, the CCSS 106 learns of the location of the user device 102. The request to join a teleconference may indicate the location of the user device 102. In this example, the CCSS 106 may learn of the location of the user device 102 by reading the location from the request. If the request from the user device 102 does not include the location of the user device 102, the CCSS 106 may request the location of the user device 102 from the location system 110. The location system 110 may determine the location of the user device 102 and send the location information to the CCSS 106.

At block 406, the CCSS 106 identifies the requested teleconference. Logic within the CCSS 106 may correlate the (i) user location and (ii) subject matter with a particular conference bridge 108. The logic within the CCSS 106 may also correlate the time of request with a particular conference bridge 108. The logic may reside in an SCP or in an application.

At block 408, the CCSS 106 joins the user into the requested teleconference. The conference bridge 108 may bridge calls from different users who are similarly located and have a similar interest. In a circuit-switched embodiment, the SCP 206 may instruct a local switch 204 to connect the user device 102 to the appropriate conference bridge 108. The instruction may include a conference bridge number in which the local switch 204 should connect the call. As a result of receiving the instruction, the local switch 204 may connect the user device 102 to the requested location based subject matter teleconference. In a packet-switched embodiment, the media server 300 may enter into a packet-based real-time media conference leg with the user device 102. The conference bridge 108 may bridge the conference leg with other users participating in the teleconference.

Although the foregoing describes circuit-switched conferences separately from packet-switched conferences, a media gateway may be provided to tie together similarly situated users through circuit-switched and packet-switched networks.

The foregoing provides a general overview of an exemplary embodiment. However, an exemplary embodiment may be adapted and used in many different ways. For example, a given location based subject matter teleconference might have a moderator or manager/host, which could be a party who set up the teleconference in the first place or could be the first party to join the teleconference. The moderator may be provided with an interface (e.g., web-based interface) to the CCSS 106, to see in real-time who is participating in the teleconference, and may be provided the ability to control who has the floor at any given time or who can participate. The moderator may have other powers as well.

Another feature may be the ability to deny participation. The CCSS 106 may refuse to allow a given user to participate for any number of reasons, including, for instance, user profile or conference capacity. An IVRU may play a message to the user indicating that the user is not allowed to participate.

An exemplary embodiment of the present invention has been described above. While many of the examples provided are sports-related examples, it is understood that an unlimited variety of subject matter categories are possible. Those skilled in the art will understand; however, that changes and modifications may be made to this embodiment without departing from the true scope and spirit of the present invention, which is defined by the claims.

We claim:

1. A method comprising:

receiving into a conference-call-setup-system (CCSS) a request from a user to join a teleconference, wherein the request indicates a subject matter of the teleconference, wherein the CCSS comprises a switch and a service control point, and wherein receiving the request from the user comprises (i) the switch receiving a feature code as digits dialed by the user from a device operated by the user, wherein the feature code corresponds with the subject matter, and (ii) the switch providing the feature code in a signaling message to the service control point;

learning a location of the user;

selecting a teleconference based on (i) the location and (ii) the subject matter, wherein the service control point has logic that correlates teleconferences with location and subject matter, wherein particular feature codes correspond respectively with particular subject matters, and wherein selecting the teleconference based on the location and the subject matter comprises the service control point referring to the logic to select as the teleconference a teleconference that matches the (i) location and (ii) the subject matter corresponding with the dialed feature code; and joining the user into the selected teleconference.

2. The method of claim 1, further comprising selecting the teleconference based on when the user requests to join the teleconference.

3. The method of claim 1, wherein the request indicates the location of the user, and wherein learning the location of the user comprises reading the location from the request.

4. The method of claim 1, wherein learning the location of the user comprises querying a location system operable to determine the location of the user.

5. The method of claim 4, wherein the location system comprises a mobile position center and a position determining entity.

6. The method of claim 5, wherein the mobile position center receives the location of a mobile subscriber terminal operated by the user from the position determining entity, wherein the mobile position center forwards the location of the mobile subscriber terminal to the CCSS.

7. The method of claim 5, wherein the position determining entity is operable to process position information obtained from a mobile subscriber terminal.

8. The method of claim 1, wherein joining the user into the teleconference comprises:

the service control point instructing the switch to connect the user to the teleconference; and the switch connecting the user to the teleconference.

9. The method of claim 8, wherein instructing the switch to connect the user to the teleconference comprises providing the switch with a routing number to which the switch should connect the call.

10. The method of claim 1, wherein the CCSS comprises a media server on a packet-switched network, and wherein receiving the request from the user comprises:

the media server receiving a session invitation message from a device operated by the user.

11. The method of claim 10, wherein the session invitation message comprises a Session Initiation Protocol (SIP) INVITE message.

12. The method of claim 10, wherein joining the user into the teleconference comprises:

the media server entering into a packet-based real-time media conference leg with the device operated by the user, wherein the media server bridges the conference leg with conference legs of other users participating in the teleconference.

13. A conference call setup system, comprising in combination:

means for receiving a request from a user to join a location based subject matter teleconference, the request indicating a subject matter, wherein the means for receiving comprises a switch and a service control point, and wherein receiving the request from the user comprises (i) the switch receiving a feature code as digits dialed by the user from a device operated by the user, wherein the feature code corresponds with the subject matter, and (ii) the switch providing the feature code in a signaling message to the service control point;

means for determining a location of the user upon receipt of the request;

means for selecting a teleconference based on (i) the location and (ii) the subject matter, wherein the means for selecting comprises the service control point, wherein the service control point has logic that correlates teleconferences with location and subject matter, wherein particular feature codes correspond respectively with particular subject matters, and wherein selecting the teleconference based on the location and the subject matter comprises the service control point referring to the logic to select as the teleconference a teleconference that matches the (i) location and (ii) the subject matter corresponding with the dialed feature code; and means for joining the user into the selected teleconference.

14. The system of claim 13, wherein the means for selecting selects the teleconference based on when the user requests to join the teleconference.

* * * * *